United States Patent
Yamazaki et al.

(10) Patent No.: US 9,914,449 B2
(45) Date of Patent: Mar. 13, 2018

(54) METHODS AND SYSTEM FOR IMPROVING EFFICIENCY OF A HYBRID VEHICLE

(71) Applicant: Ford Global Technologies, LLC, Dearborn, MI (US)

(72) Inventors: Mark Steven Yamazaki, Canton, MI (US); Christopher Alan Lear, Dearborn, MI (US); Scott James Thompson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/994,554

(22) Filed: Jan. 13, 2016

(65) Prior Publication Data

US 2017/0197611 A1 Jul. 13, 2017

(51) Int. Cl.
| | |
|---|---|
| *B60L 9/00* | (2006.01) |
| *G05D 1/00* | (2006.01) |
| *B60W 20/15* | (2016.01) |
| *B60W 20/13* | (2016.01) |
| *B60W 10/06* | (2006.01) |
| *B60W 10/08* | (2006.01) |
| *B60W 10/10* | (2012.01) |
| *B60W 10/26* | (2006.01) |
| *B60W 30/14* | (2006.01) |
| *B60W 50/00* | (2006.01) |
| *B60K 6/48* | (2007.10) |
| *B60W 20/11* | (2016.01) |

(52) U.S. Cl.
CPC ............... *B60W 20/15* (2016.01); *B60K 6/48* (2013.01); *B60W 10/06* (2013.01); *B60W 10/08* (2013.01); *B60W 10/10* (2013.01); *B60W 10/26* (2013.01); *B60W 20/11* (2016.01); *B60W 20/13* (2016.01); *B60W 30/143* (2013.01); *B60W 50/0098* (2013.01); *B60K 2006/4825* (2013.01); *B60W 30/14* (2013.01); *B60W 2050/0075* (2013.01); *Y02T 10/6221* (2013.01); *Y02T 10/6252* (2013.01); *Y02T 10/6286* (2013.01)

(58) Field of Classification Search
None
See application file for complete search history.

(56) References Cited

U.S. PATENT DOCUMENTS

| | | | | |
|---|---|---|---|---|
| 5,615,933 A | * | 4/1997 | Kidston | ........... B60L 3/102 180/65.1 |
| 5,722,502 A | * | 3/1998 | Kubo | ........... B60K 6/442 180/65.23 |

(Continued)

OTHER PUBLICATIONS

Yamazaki, Mark Steven et al., "Hybrid Electric Vehicle and Method of Control," U.S. Appl. No. 14/665,540, filed Mar. 23, 2015, 23 pages.

*Primary Examiner* — Bhavesh V Amin
(74) *Attorney, Agent, or Firm* — David Kelley; McCoy Russell LLP (57) ABSTRACT

Systems and methods for operating a hybrid powertrain that includes an engine and a motor/generator are described. The systems and methods adjust battery charging and discharging as well as engine and motor torque based on whether or not the vehicle is operating in a cruise control mode. In one example, curves that provide a basis for operating an engine and motor based on driver demand torque are compressed during a vehicle cruise control mode to improve powertrain efficiency.

19 Claims, 7 Drawing Sheets

(56) References Cited

U.S. PATENT DOCUMENTS

| | | | | |
|---|---|---|---|---|
| 5,820,172 A * | 10/1998 | Brigham | B60K 6/485 | 180/65.26 |
| 5,832,396 A * | 11/1998 | Moroto | B60K 6/485 | 180/65.26 |
| 6,196,188 B1 * | 3/2001 | Janic | F02D 11/105 | 123/350 |
| 6,209,672 B1 * | 4/2001 | Severinsky | B60K 6/442 | 180/65.23 |
| 6,269,290 B1 * | 7/2001 | Egami | B60K 6/26 | 290/45 |
| 6,364,806 B1 * | 4/2002 | Spaniel | B60K 1/02 | 180/65.7 |
| 6,469,512 B2 * | 10/2002 | Singh | G01R 31/3662 | 324/426 |
| 6,959,241 B2 * | 10/2005 | Itow | B60K 6/485 | 123/361 |
| 6,960,152 B2 * | 11/2005 | Aoki | B60L 15/20 | 477/3 |
| 7,040,434 B2 * | 5/2006 | Komiyama | B60K 6/365 | 180/65.235 |
| 7,200,476 B2 * | 4/2007 | Cawthorne | B60K 6/445 | 180/65.265 |
| 7,520,353 B2 * | 4/2009 | Severinsky | B60H 1/004 | 180/65.265 |
| 7,770,678 B2 * | 8/2010 | Nozaki | B60K 6/48 | 180/65.265 |
| 8,790,215 B2 * | 7/2014 | Sujan | B60W 10/02 | 477/5 |
| 8,888,652 B2 | 11/2014 | Sujan et al. | | |
| 9,073,545 B2 * | 7/2015 | Whitney | B60W 10/06 | |
| 9,233,691 B2 * | 1/2016 | Tseng | B60W 10/06 | |
| 2003/0218447 A1 * | 11/2003 | Coates | B60K 6/445 | 320/134 |
| 2004/0088103 A1 * | 5/2004 | Itow | B60K 6/485 | 701/110 |
| 2004/0134698 A1 * | 7/2004 | Yamamoto | B60K 6/44 | 180/65.225 |
| 2004/0181323 A1 * | 9/2004 | Yuan | B60L 15/2045 | 701/22 |
| 2005/0061562 A1 * | 3/2005 | Mack | B60K 6/445 | 180/65.235 |
| 2005/0209046 A1 * | 9/2005 | Potter | F16H 61/0213 | 477/115 |
| 2007/0080664 A1 * | 4/2007 | Maguire | H02J 7/0014 | 320/116 |
| 2007/0191180 A1 * | 8/2007 | Yang | B60K 6/387 | 477/5 |
| 2008/0021628 A1 * | 1/2008 | Tryon | B60K 6/46 | 701/99 |
| 2008/0067972 A1 * | 3/2008 | Takami | H01M 4/485 | 320/103 |
| 2008/0314658 A1 * | 12/2008 | Atarashi | B60K 6/445 | 180/65.25 |
| 2009/0118962 A1 * | 5/2009 | Heap | B60K 6/365 | 701/99 |
| 2009/0150015 A1 * | 6/2009 | Okubo | B60W 30/188 | 701/22 |
| 2009/0259354 A1 * | 10/2009 | Krupadanam | B60W 10/06 | 701/22 |
| 2009/0309416 A1 * | 12/2009 | Bose | B60K 6/32 | 307/9.1 |
| 2010/0019727 A1 * | 1/2010 | Karden | B60L 11/1861 | 320/129 |
| 2010/0283430 A1 * | 11/2010 | Chaturvedi | H01M 10/482 | 320/134 |
| 2010/0285339 A1 * | 11/2010 | Chaturvedi | H01M 10/0525 | 429/61 |
| 2011/0307130 A1 * | 12/2011 | Gow | B60G 17/0195 | 701/22 |
| 2012/0029777 A1 * | 2/2012 | Tao | F16H 61/0213 | 701/60 |
| 2012/0248873 A1 * | 10/2012 | Oudalov | H02J 3/32 | 307/52 |
| 2012/0306275 A1 * | 12/2012 | Christensen | H01M 10/052 | 307/80 |
| 2013/0066493 A1 * | 3/2013 | Martin | B60W 20/00 | 701/22 |
| 2013/0169232 A1 * | 7/2013 | Middleton | G01R 31/362 | 320/134 |
| 2013/0346001 A1 * | 12/2013 | Park | G01R 31/3679 | 702/63 |
| 2014/0088103 A1 * | 3/2014 | Brown | C07D 403/04 | 514/234.5 |
| 2014/0358400 A1 * | 12/2014 | Whitney | B60W 10/198 | 701/102 |
| 2015/0057866 A1 * | 2/2015 | Tseng | B60W 30/19 | 701/22 |
| 2015/0191139 A1 * | 7/2015 | Schindler | B60L 1/00 | 307/10.1 |
| 2016/0214596 A1 * | 7/2016 | Glugla | B60W 10/00 | |
| 2016/0221469 A1 * | 8/2016 | Cheng | B60K 6/48 | |

\* cited by examiner

METHODS AND SYSTEM FOR IMPROVING EFFICIENCY OF A HYBRID VEHICLE

FIELD

The present description relates to methods and a system for operating a powertrain of a hybrid vehicle. The methods and systems may be particularly useful for hybrid vehicles that provide wheel torque via an engine and motor positioned along a shaft providing input to a transmission.

BACKGROUND AND SUMMARY

A hybrid vehicle may include an engine and a motor to propel the vehicle. The engine and motor may be activated at different times or at a same time. The engine may be used during long cruise conditions while the motor may be used to launch the vehicle from a stop. The engine and motor may both be activated during conditions where engine efficiency may be increased via operating the motor to meet a requested driver demand torque. However, not all combinations of engine torque and motor torque to provide the desired driver demand torque are equal in powertrain efficiency. Therefore, it may be desirable to provide a way of selecting engine and motor torques that increases powertrain efficiency.

The inventors herein have recognized the above-mentioned issues and have developed a powertrain operating method, comprising: distributing a driver demand torque request between an engine and a motor responsive to a first battery charging curve and a first battery discharging curve while not operating a vehicle in cruise control mode; and distributing the driver demand torque request between the engine and the motor responsive to a second battery charging curve and a second battery discharging curve while operating the vehicle in cruise control mode.

By distributing a driver demand torque request between a motor and an engine based on whether or not a vehicle in which the motor and engine operate is in a cruise control mode, it may be possible to provide the technical result of increased powertrain or driveline efficiency while the vehicle is operating in cruise control mode. For example, battery charging and discharging curves may be established for operating a vehicle in cruise control mode and for not operating the vehicle in cruise control mode. The battery charging and discharging curves for operating the vehicle in cruise control mode may direct engine operating conditions closer to a center of an area of low fuel consumption region of an engine brake specific fuel consumption map so that engine efficiency and motor efficiency may be improved as compared to if the engine and motor were operated based on the battery charging and discharging curves for not operating the vehicle in cruise control mode.

The present description may provide several advantages. For example, the approach may provide increased powertrain efficiency. Further, the approach may increase the possibility of operating the vehicle's motor so as to improve engine operating efficiency. Additionally, the approach may reduce transmission shifting by augmenting engine torque with motor torque so that vehicle speed may be maintained without downshifting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
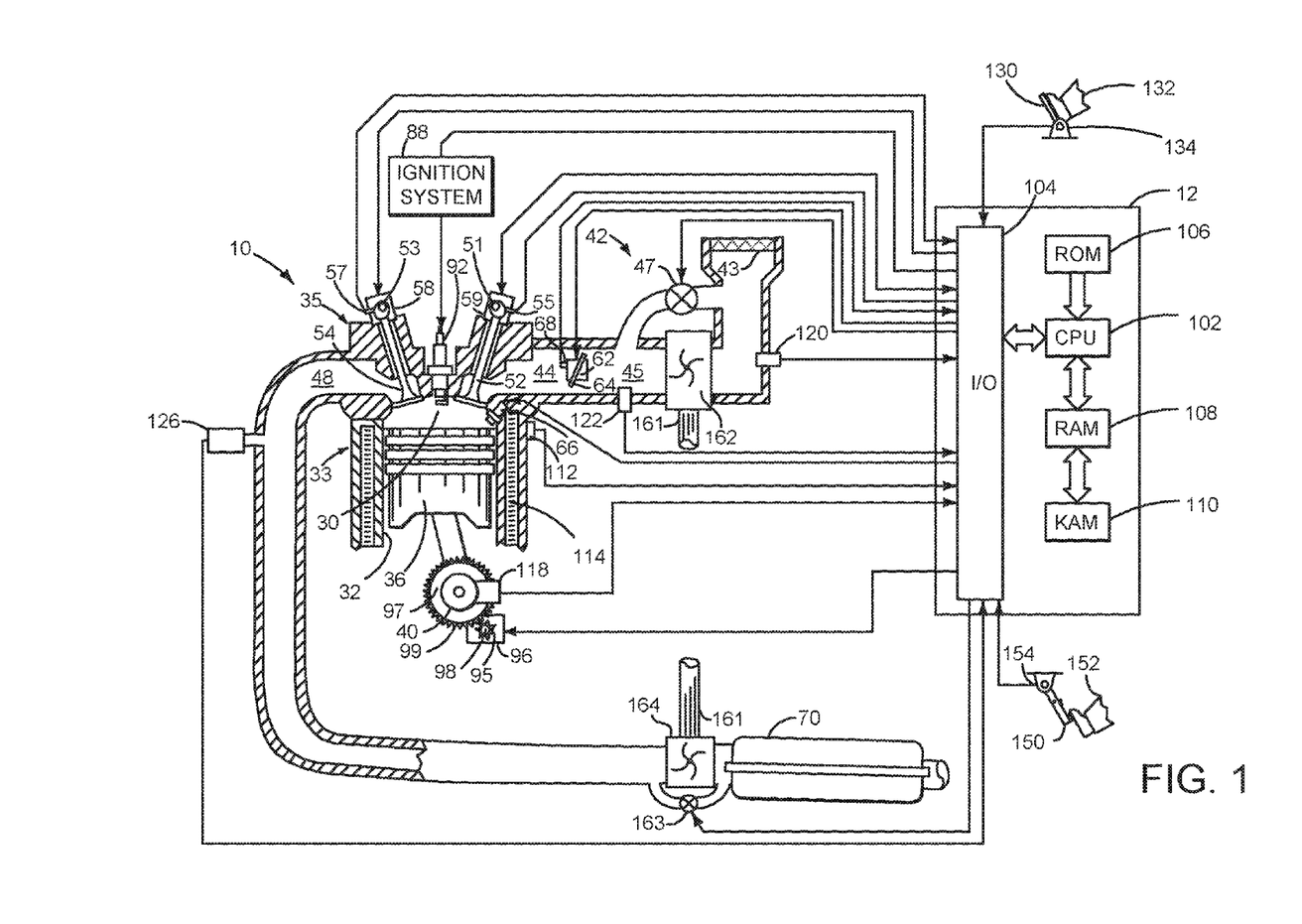
FIG. 1 is a schematic diagram of an engine.
Figure 2:
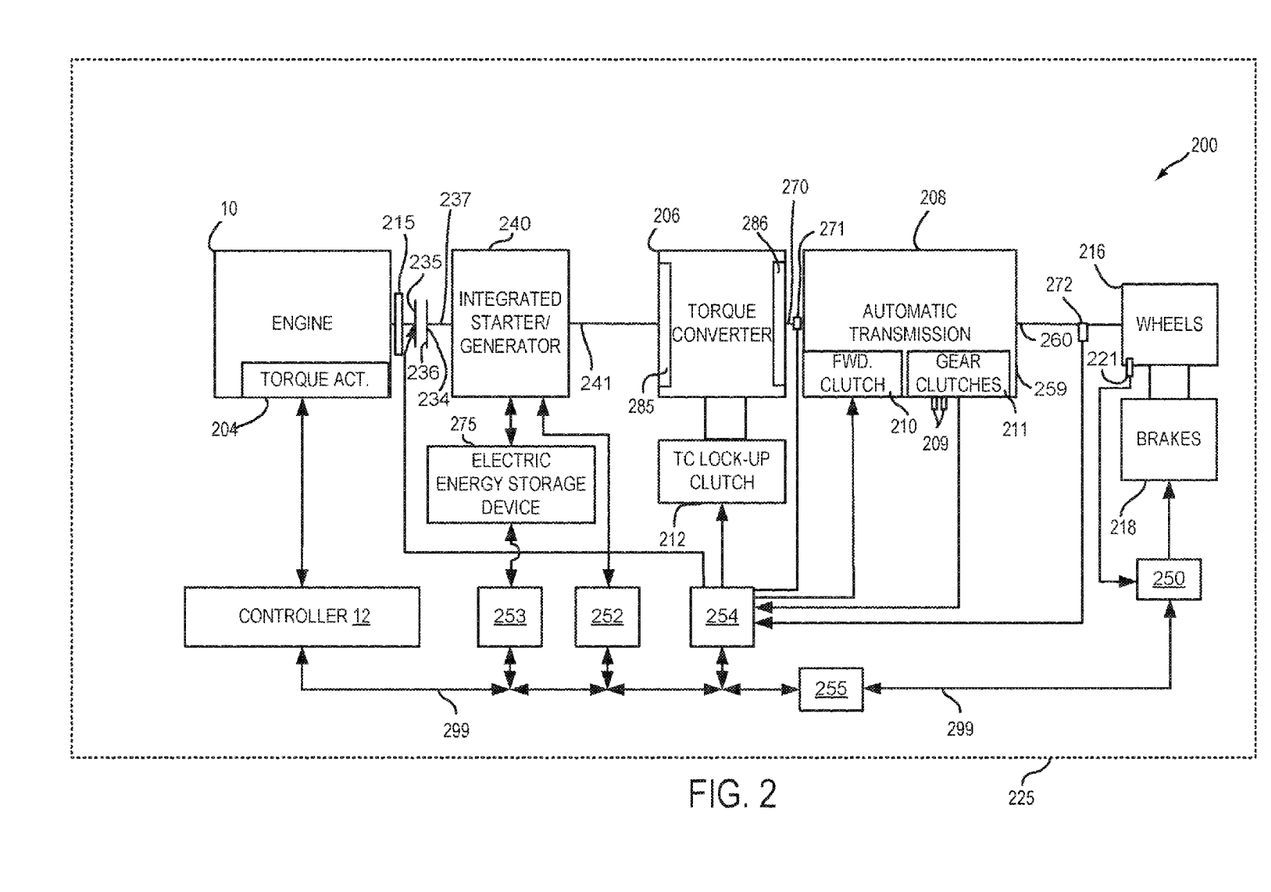
FIG. 2 is a schematic diagram of a hybrid vehicle powertrain.

The present description is related to operating an engine and a motor of a hybrid vehicle while the vehicle is in a cruise control mode and while the vehicle is not in cruise control mode. The hybrid vehicle may include an engine as is shown in FIG. 1. The engine of FIG. 1 may be included in a powertrain as is shown in FIG. 2. The engine and motor may be operated according to the control functions shown in FIGS. 3-6. The hybrid vehicle may operate according to the flowchart shown in FIG. 7.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a motor/generator; a disconnect clutch positioned in a powertrain between the engine and the motor; a transmission coupled to the motor/generator; and a controller including executable instructions stored in non-transitory memory to downshift a transmission from a gear at a first driver demand torque while a vehicle is operated in a cruise control mode and downshift the transmission from the gear at a second driver demand torque while the vehicle is not operated in the cruise control mode. The system includes where the gear is a highest gear in the transmission. The system further comprises additional instructions to activate a first battery charging and discharging strategy when not operating the vehicle in the cruise control mode, and further comprising additional instructions to activate a second battery charging and discharging strategy when operating the vehicle in the cruise control mode.

In some examples, the system includes where the first battery charging and discharging strategy does not charge or discharge a vehicle battery when the vehicle battery charge is within a first battery state of charge range. The system further comprises additional instructions to distribute a driver demand torque request between an engine and a motor responsive to a first battery charge curve and a first battery discharge curve while not operating the vehicle in the cruise control mode. The system further comprises additional instructions to distribute the driver demand torque request between the engine and the motor responsive to a second battery charge curve and a second battery discharge curve while operating the vehicle in cruise control mode. The system includes where vehicle speed is controlled to a desired speed in the vehicle cruise control mode via adjusting engine torque and motor torque.

Figure 3:
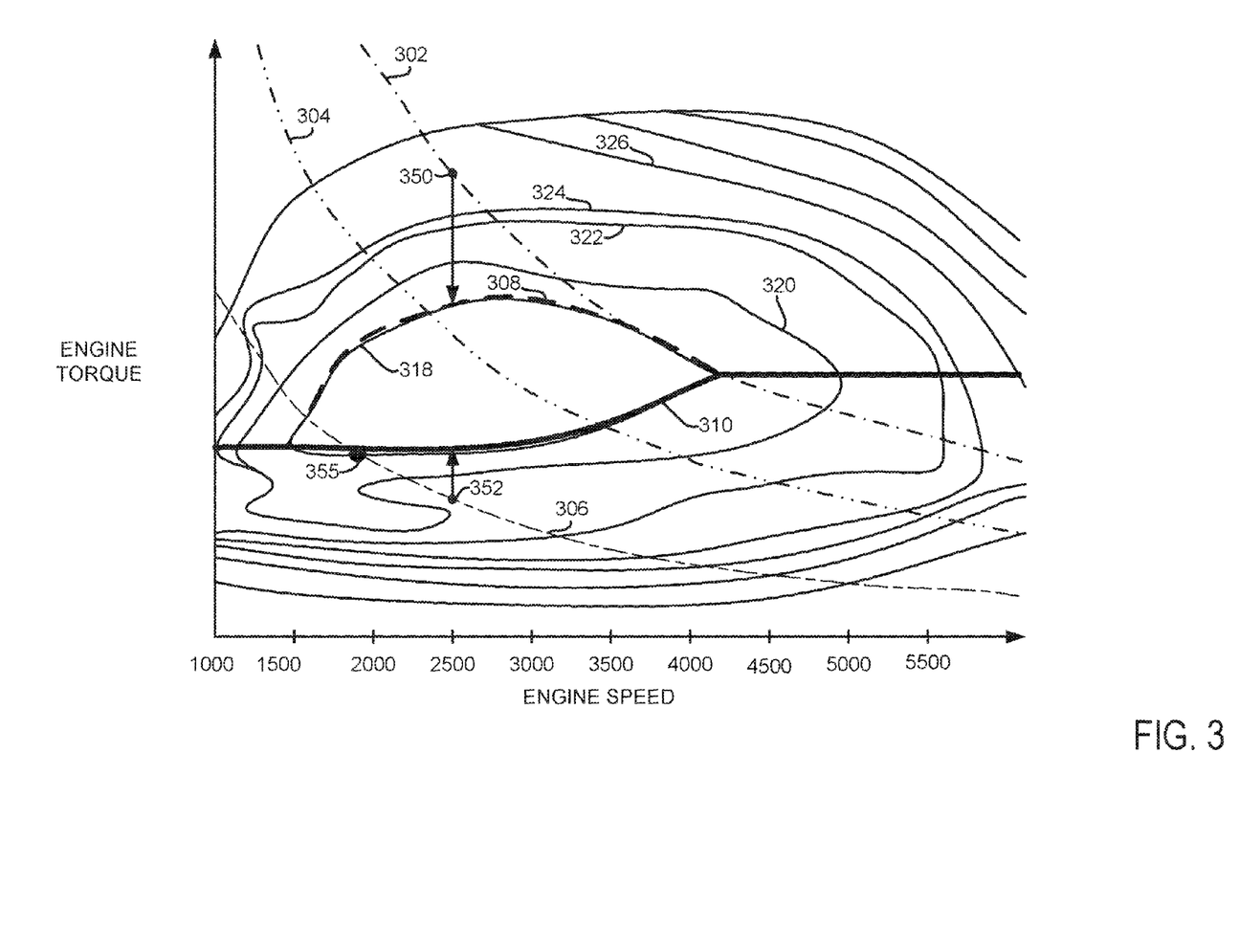
FIG. 3 is a plot showing example nominal battery charging and discharging curves with respect to an engine brake specific fuel consumption map.

Referring now to FIG. 3, an example plot or map of engine brake specific fuel consumption, a battery charging curve, and a battery discharging curve is shown. The engine brake specific fuel consumption map, the battery charging curve, and the battery discharging curve are a basis for distributing a driver demand power between the engine and the ISG. The vertical axis represents engine torque and the horizontal axis represents engine speed. Engine torque increases in the direction of the vertical axis arrow and engine speed increases in the direction of the horizontal axis arrow.

Curves 302, 304, and 306 represent constant powertrain power curves. Curve 302 represents 120 kW of request constant power, curve 304 represents 80 kW of requested constant power, and curve 306 represents 40 kW of requested constant power. Inner curve 318 is oval-like in shape and it represents a constant low engine fuel consumption rate (e.g., 245 gm/kWh) for all engine speeds and torques lying within its boundary. Curve 318 and similar curves may be described as a fuel consumption islands because of their shapes. Curves 320 (e.g., 260 gm/kWh), 322 (e.g., 266 gm/kWh), 324 (e.g., 278 gm/kWh), and 326 (e.g., 286 gm/kWh) represent constant increasing engine fuel consumption rates. Curves 318-326 may be formed by operating an engine at various speeds and torques, plotting fuel consumption values for the various engine speeds and torques, then connecting like fuel consumption rates with lines. Heavy dashed line curve 308 represents a battery discharging curve. Heavy line curve 310 represents a battery charging curve. The battery charging curve follows a constant low fuel consumption boundary that corresponds to lowest engine torque values so that engine operation conditions may be driven within the boundary of the low fuel consumption boundary. The battery discharging curve follows the same constant flow fuel consumption boundary but at highest engine torque values so that engine operating conditions may be driven within the boundary of low fuel consumption.

If an engine is operating at speed and torque for operating conditions 352 based on a driver powertrain power request equal to 40 kW (e.g., line 306), engine and powertrain efficiency may be improved by operating the engine at a speed and torque that is within curve 318. In particular, for increasing powertrain efficiency while maintaining a constant vehicle speed, engine torque may be increased from a level shown at 352 to an engine torque level corresponding to the location the arrow extending from 352 intersects battery charging curve 310. At the same time engine torque is increasing, motor torque is decreased equally in magnitude to the increase in engine torque so that $T_{DD}=T_{ENG}+T_{MOT}$, where $T_{DD}$ is driver demand for a request powertrain power, $T_{ENG}$ is engine torque, and $T_{MOT}$ is motor torque. In this way, the powertrain efficiency may be improved by adjusting engine and motor operating conditions.

If an engine is operating at speed and torque for operating conditions 350 based on a driver powertrain power request equal to 120 kW (e.g., line 302), engine and powertrain efficiency may be improved by operating the engine at a speed and torque that is within curve 318. Specifically, for increasing powertrain efficiency while maintaining a constant vehicle speed, engine torque may be decreased from a level shown at 350 to an engine torque level corresponding to the location the arrow extending from 350 intersects battery discharging curve 308 while maintaining constant engine speed. At the same time engine torque is decreasing, motor torque is increased equally in magnitude to the decrease in engine torque. In this way, the powertrain efficiency may be improved by adjusting engine and motor operating conditions. Thus, the engine operating conditions may be adjusted to operate the engine at the battery charging curve 310 or the battery discharging curve 308 depending on the requested power demand and engine speed.

In one example, a vehicle operating at highway speed requires 40 kW to maintain vehicle speed. The 40 kW may be provided by operating the engine at 355, which is close to battery charging line 310. Thus, the 40 kW may be provided with only a small amount of motor power. However, the motor may operate much less efficient (e.g., 50% efficiency as compared to 90% efficiency) at low power levels. Therefore, it may not be desirable to operate the motor at battery charging curve 310.

By operating the engine according to the battery charging curve 310 and battery discharging curve 308, desired powertrain efficiency and performance when operating the vehicle in stop and go traffic or at lower vehicle speeds.

Figure 4:
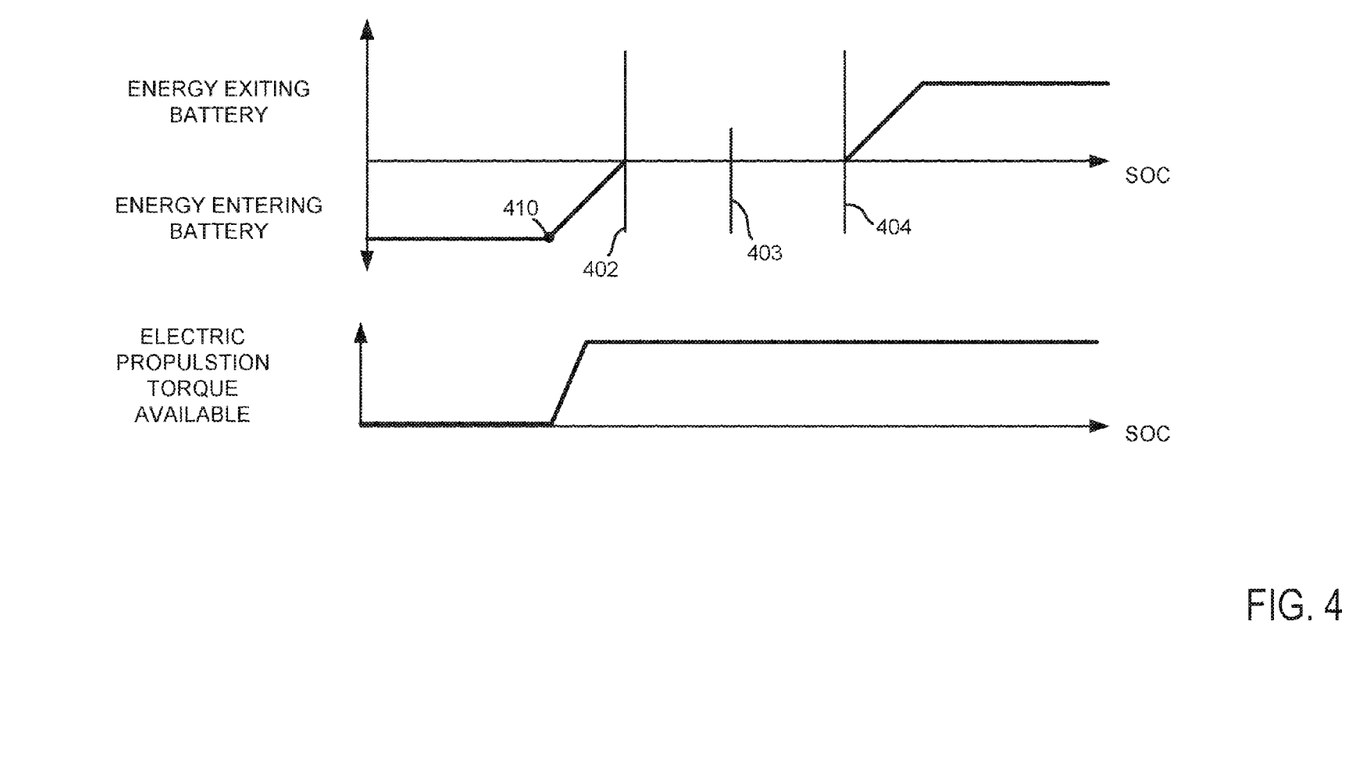
FIG. 4 is a plot showing example nominal energy flow to or from a battery based on battery state of charge (SOC)

Referring now to FIG. 4, a weighting function for maintaining battery state of charge within a desired range is shown. The weighting function includes a vertical axis representing energy entering the vehicle battery (e.g., area below the horizontal axis) and energy exiting the vehicle battery (e.g., area above the horizontal axis). The horizontal axis represents battery state of charge (SOC) and battery state of charge increases from the intersection of the vertical axis and the horizontal axis (e.g., zero SOC) in the direction of the horizontal axis arrow.

Vertical line 402 represents 40% SOC, vertical line 403 represents 50% SOC, and vertical line 404 represents 60% SOC. The area to the left of vertical line 402 represents a battery SOC area where the weighting function requests opportunistic battery charging. In other words, the weighting function requests battery charging when driver demand power is low so that the battery may be charged via the vehicle's kinetic energy or via the engine. The area to the right of vertical line 404 represents a battery SOC area where the weighting function requests opportunistic battery discharging. The battery may be opportunistically discharged when the driver demand power may be met by the motor or by the motor and the engine. At 410, the battery charge is sufficiently low to limit battery discharge to zero. In other words, the battery is not allowed to be discharged below the SOC at 410. Electric propulsion torque provided by the motor using charge from the battery may be provided for battery SOC values greater than 410.

In the SOC region between 402 and 404, the weighting function does not request charge be added to or be taken away from the battery. Thus, by discharging the battery at higher SOC values and charging the battery at lower SOC values, the battery SOC is directed toward 50% SOC. This weighting function may provide desired powertrain efficiency and performance when operating the vehicle in stop and go traffic or at lower vehicle speeds.

Figure 5:
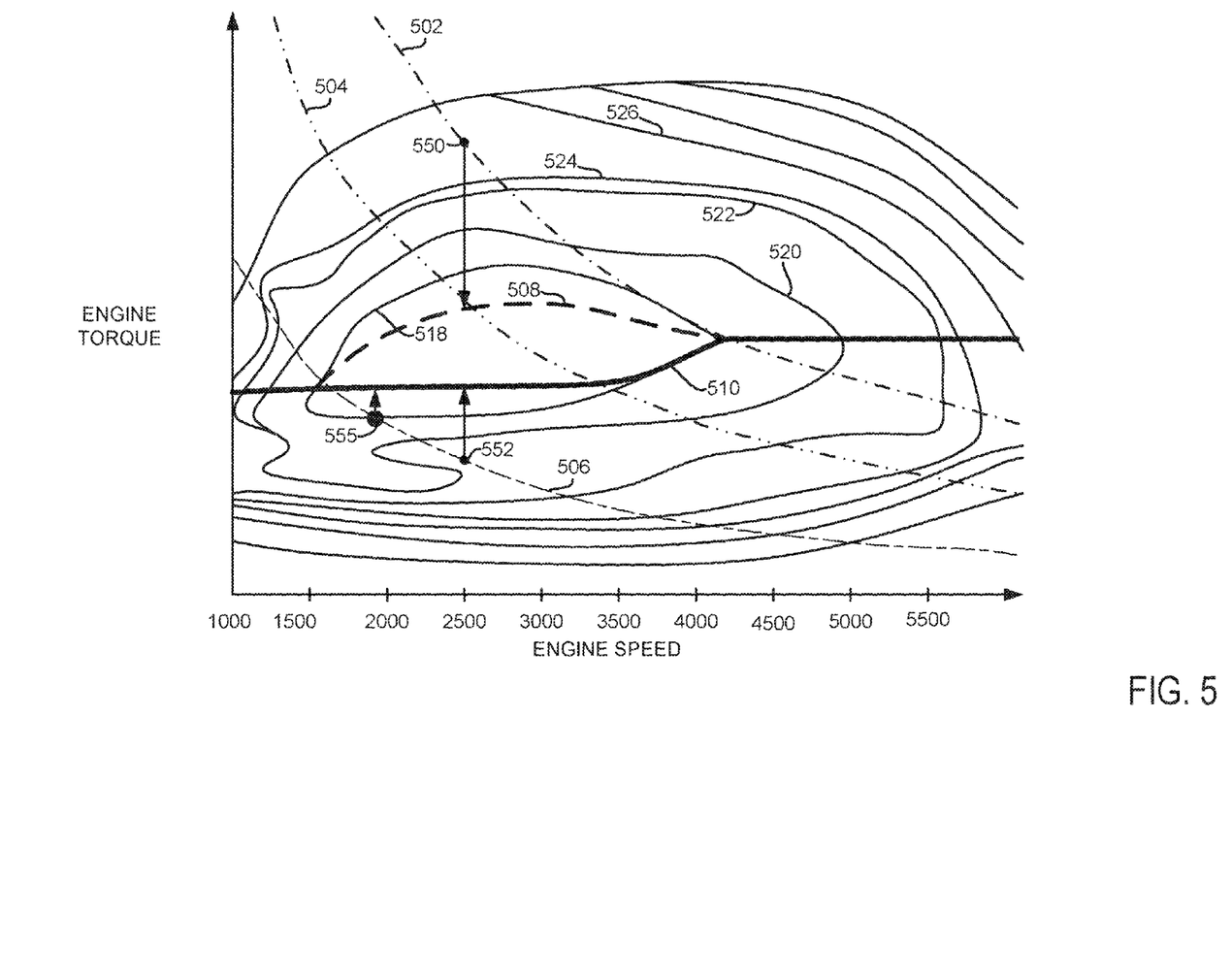
FIG. 5 is a plot showing example vehicle cruise control mode battery charging and discharging curves with respect to an engine brake specific fuel consumption map.

Referring now to FIG. 5, a second example plot or map of engine brake specific fuel consumption, a battery charging curve, and a battery discharging curve is shown. The engine brake specific fuel consumption map, the battery charging curve, and the battery discharging curve are a basis for distributing a driver demand power between the engine and the ISG. The vertical axis represents engine torque and the horizontal axis represents engine speed. Engine torque increases in the direction of the vertical axis arrow and engine speed increases in the direction of the horizontal axis arrow. The portions of FIG. 5 identified by 5 series numbers are the same as the portions of FIG. 3 identified by 3 series numbers. For example, curve 326 is a same curve as 526 unless otherwise noted.

Curves 502, 504, and 506 represent constant powertrain power curves. Curve 502 represents 120 kW of request constant power, curve 504 represents 80 kW of requested constant power, and curve 506 represents 40 kW of requested constant power. Inner curve 518 is oval-like in shape and it represents a constant low engine fuel consumption rate (e.g., 245 gm/kWh) for all engine speeds and torques lying within its boundary. Curve 518 and similar curves may be described as a fuel consumption islands because of their shapes. Curves 520 (e.g., 260 gm/kWh), 522 (e.g., 266 gm/kWh), 524 (e.g., 278 gm/kWh), and 526 (e.g., 286 gm/kWh) represent constant increasing engine fuel consumption rates. Curves 518-526 may be formed by operating an engine at various speeds and torques, plotting fuel consumption values for the various engine speeds and torques, then connecting like fuel consumption rates with lines. Heavy dashed line curve 508 represents a battery discharging curve. Curve 508 lies within curve 518, which is the same as curve 318 of FIG. 3. Thus, curve 508 is located at lower engine torques than curve 308 of FIG. 3. Heavy line curve 510 represents a battery charging curve. Curve 510 lies within curve 518. Curve 510 is located at higher engine torques than curve 310 of FIG. 3. Thus curves 508 and 510 are closer to the center of the engine fuel consumption island formed by curve 518 than curves 308 and 310 of FIG. 3. Further, curves 508 and 510 bound a smaller engine speed/torque region than curves 308 and 310 of FIG. 3. Thus, to operate the engine at battery discharge curve 510 may require additional engine torque as compared to operating the engine at curve 310 of FIG. 3 when the power demand is at conditions 352/552. Similarly, operating the engine at curve 508 may require less engine torque as compared to operating the engine at curve 308 of FIG. 3 when the power demand is at conditions 350/550.

If an engine is operating at speed and torque for operating conditions 552 based on a driver powertrain power request equal to 40 kW (e.g., line 506), engine and powertrain efficiency may be improved by operating the engine at a speed and torque that is within curve 518. In particular, for increasing powertrain efficiency while maintaining a constant vehicle speed, engine torque may be increased from a level shown at 552 to an engine torque level corresponding to the location the arrow extending from 552 intersects battery charging curve 510. At the same time engine torque is increasing, motor torque is decreased equally in magnitude to the increase in engine torque so that $T_{DD}=T_{ENG}+T_{MOT}$, where $T_{DD}$ is driver demand for a request powertrain power, $T_{ENG}$ is engine torque, and $T_{MOT}$ is motor torque. Thus, engine torque output is increased as compared to moving engine operation from 352 of FIG. 3 to curve 310.

If an engine is operating at speed and torque for operating conditions 550 based on a driver powertrain power request equal to 120 kW (e.g., line 502), engine and powertrain efficiency may be improved by operating the engine at a speed and torque that is within curve 518. Specifically, for increasing powertrain efficiency while maintaining a constant vehicle speed, engine torque may be decreased from a level shown at 550 to an engine torque level corresponding to the location the arrow extending from 550 intersects battery discharging curve 508 while maintaining engine speed. At the same time engine torque is decreasing, motor torque is increased equally in magnitude to the decrease in engine torque. Thus, engine torque output is decreased as compared to moving engine operation from 350 of FIG. 3 to curve 308. Thus, the engine operating conditions may be adjusted to operate the engine at the battery charging curve 510 or the battery discharging curve 508 depending on the requested power demand and engine speed.

Further, if the vehicle is operated at highway speed, which requires 40 kW to maintain vehicle speed, the 40 kW may be provided by operating the engine at an intersection of curve 510 and a line extending from 555. Consequently, the motor output is increased to thereby increase motor and driveline or powertrain efficiency. Therefore, compressing curves 510 and 508 toward the center of the engine fuel consumption island provided by curve 518 may increase powertrain efficiency. By operating the engine according to the battery charging curve 510 and battery discharging curve 508, desired powertrain efficiency and performance may be improved when operating the vehicle at highway speeds in a cruise control mode because the motor may operate at conditions where it may be more efficient.

Figure 6:
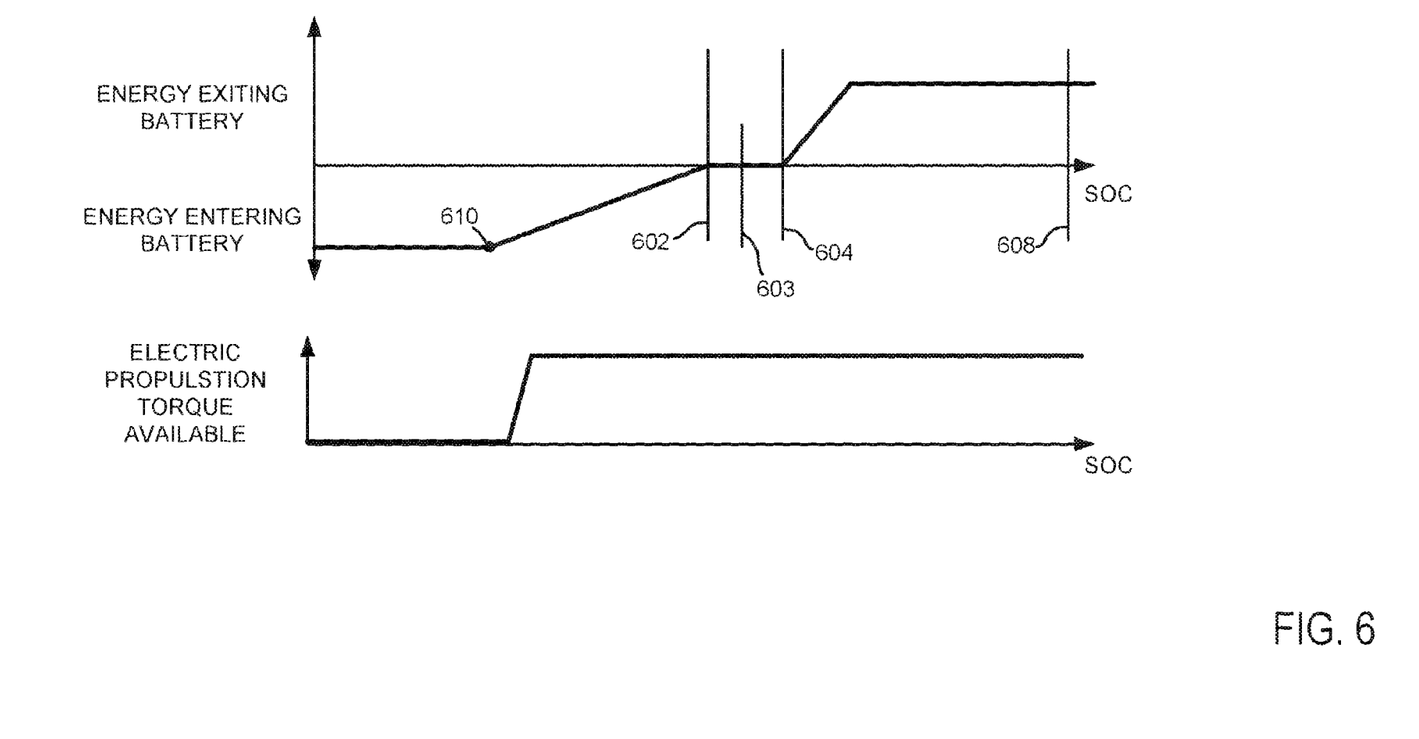
FIG. 6 is a plot showing example vehicle cruise control mode energy flow to or from a battery based on battery state of charge (SOC)

Referring now to FIG. 6, a second weighting function or strategy for maintaining battery state of charge within a desired range is shown. The weighting function includes a vertical axis representing energy entering the vehicle battery (e.g., area below the horizontal axis) and energy exiting the vehicle battery (e.g., area above the horizontal axis). The horizontal axis represents battery state of charge (SOC) and battery state of charge increases from the intersection of the vertical axis and the horizontal axis (e.g., zero SOC) in the direction of the horizontal axis arrow.

Vertical line 602 represents 50% SOC, vertical line 603 represents 55% SOC, and vertical line 604 represents 60% SOC. The area to the left of vertical line 602 represents a battery SOC area where the weighting function requests opportunistic battery charging. The area to the right of vertical line 604 represents a battery SOC area where the weighting function requests opportunistic battery discharging. The battery may be opportunistically discharged when the driver demand power may be met by the motor or by the motor and the engine. At 610, the battery charge is sufficiently low to limit battery discharge to zero. In other words, the battery is not allowed to be discharged below the SOC at 610. Electric propulsion torque provided by the motor using charge from the battery may be provided for battery SOC values greater than 610.

In the SOC region between 602 and 604, the weighting function does not request charge be added to or be taken away from the battery. Thus, by discharging the battery at higher SOC values and charging the battery at lower SOC values, the battery SOC is directed toward 55% SOC. This weighting function may provide desired powertrain efficiency and performance when operating the vehicle in cruise control mode at higher speeds because the battery is biased to a higher SOC so that the motor may be operated more often to provide greater powertrain efficiency.

Figure 7:
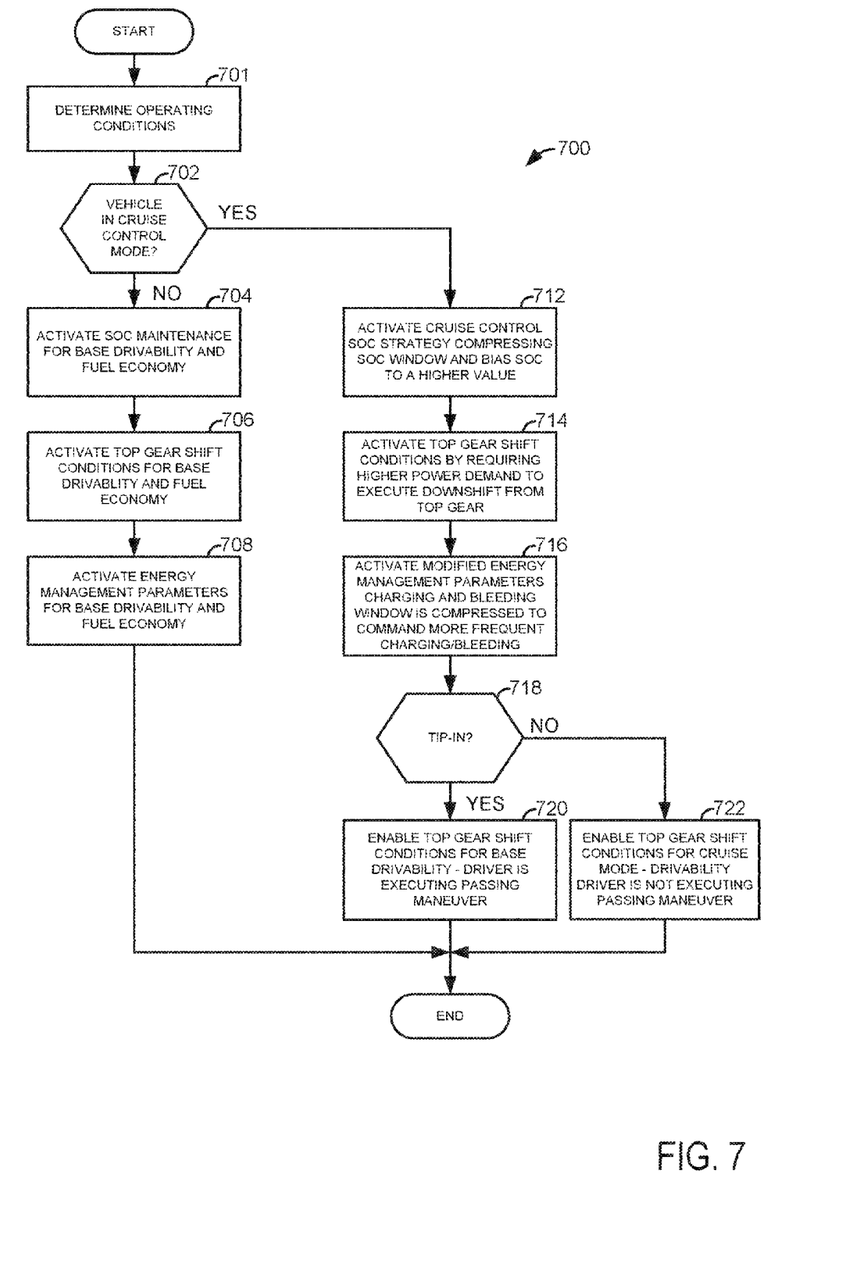
FIG. 7 shows an example flow chart for operating an engine and motor while a vehicle is in cruise control mode and while the vehicle is not in cruise control mode.

Referring now to FIG. 7, an example flow chart for operating an engine and motor in cruise control mode and non-cruise control mode is shown. The method of FIG. 7 may operate the engine based on engine brake specific fuel consumption maps and battery SOC weighting functions shown in FIGS. 3-6. Further, at least portions of the method of FIG. 7 may be incorporated as executable instructions stored in non-transitory memory while other portions of the method may be performed via a controller transforming operating states of devices and actuators in the physical world.

At 701, method 700 determines operating conditions. Operating conditions may include but are not limited to requested powertrain power, driver demand torque, engine speed, motor speed, vehicle speed, engine coolant temperature, and ambient temperature. In one example, powertrain power and/or driver demand torque are determined based on accelerator pedal position and vehicle speed indexing a table of empirically determined engine torques and powertrain power levels. Method 700 proceeds to 702 after operating conditions are determined.

At 702, method 700 judges if the vehicle is operating in a cruise control mode. In one example, the vehicle is operating in a cruise control mode when vehicle speed is maintained at a desired vehicle speed by adjusting one or more torque actuators that adjust engine and/or motor torque. Thus, vehicle speed is maintained at a desired speed via adjusting powertrain torque output or input. Further, the vehicle speed may be maintained at the desired vehicle speed without input from a driver requesting torque. This contrasts to operating the vehicle in a torque control mode where vehicle speed is allowed to vary and powertrain torque is adjusted to a desired torque. The vehicle may be in a cruise control mode after a driver requests cruise control operation via a switch or human/machine input. If method 700 judges that the vehicle is in cruise control mode or if cruise control mode is requested, the answer is yes and method 700 proceeds to 712. Otherwise, the answer is no and method 700 proceeds to 704.

At 704, method 700 activates a weighting function for battery SOC maintenance for base drivability and fuel economy. In one example, the weighting function for base SOC maintenance directs battery SOC to a nominal 50% SOC. Further, the weighting function SOC nominal value for base SOC maintenance is less than the nominal SOC value for operating the vehicle in cruise control mode. Additionally, a SOC range where battery discharging or charging is not requested is made larger (e.g., 20% SOC) as shown in FIG. 4 so that the battery may charge less often and reduce battery usage. For example, the battery SOC where battery charging is requested is adjusted to 40% SOC and lower. Method 700 proceeds to 706 after the weighting function for base drivability and fuel economy is activated.

At 706, method 700 activates top gear shift conditions for based drivability and fuel economy. The top gear is a highest gear of a fixed ratio transmission (e.g., $8^{th}$ gear of an eight gear transmission). The top gear shift conditions are activated via activating a base drivability and fuel economy gear shift schedule. The base drivability and fuel economy gear shift schedule may downshift at lower requested driver demand torques or powertrain power levels than a shift schedule for operating the vehicle in a cruise control mode. Method 700 proceeds to 708 after the based transmission shift schedule is activated.

At 708, method 700 activates vehicle energy management parameters for base drivability and fuel economy. In one example, the base drivability and fuel economy parameters include a battery charge curve and a battery discharge curve as shown in FIG. 3. The vehicle system controller may adjust engine operating conditions so that the engine operates along the battery charging curve or the battery discharging curve to increase powertrain efficiency. The motor operating conditions are adjusted to allow the engine to operate at conditions along the battery charging curve or the battery discharging curve (e.g., curves where engine BFSC is less than a threshold level) while meeting driver demanded powertrain power. In other words, the engine is operated at conditions described by the battery charging and discharging curves.

In one example, the driver demand torque or powertrain power level determined at 701 is allocated between the engine and the motor based on the engine's base BFSC map (e.g., FIG. 3). In particular, the engine is operated at its present speed at a torque level corresponding to a nearest battery charging curve or battery discharging curve. For example, as described in FIG. 3, if the engine is operating at conditions 350 of FIG. 3, the engine is moved along its present speed to a torque where engine torque intersects battery discharge curve 308. Driver demand torque is met by adjusting motor torque such that $T_{DD}=T_{ENG}+T_{MOT}$. In this way, driver demand torque is distributed between the motor and the engine. Further, the engine, motor, and transmission are operated based on the transmission shift schedule described at 706, the SOC weighting function described at 704, and the energy management parameters.

At 712, method 700 activates a weighting function for battery SOC maintenance for vehicle cruise control mode. In one example, the weighting function for vehicle cruise control mode SOC maintenance directs battery SOC to a nominal 55% SOC. Further, the weighting function SOC nominal value for vehicle cruise control mode SOC maintenance is greater than the nominal SOC value for operating the vehicle at base conditions or non-cruise control mode. Additionally, a SOC range where battery discharging or charging is not requested is made smaller (e.g., 10% SOC) as shown in FIG. 6 so that the battery may charge less often and reduce battery usage. For example, the battery SOC where battery charging is requested is adjusted to 50% SOC and lower. Method 700 proceeds to 714 after the weighting function for base drivability and fuel economy is activated.

At 714, method 700 activates top gear shift conditions for cruise control mode drivability and fuel economy. The top gear is a highest gear of a fixed ratio transmission (e.g., $8^{th}$ gear of an eight gear transmission). The top gear shift conditions are activated via activating a cruise control mode drivability and fuel economy gear shift schedule. The cruise control mode drivability and fuel economy gear shift schedule may downshift at higher requested driver demand torques or powertrain power levels than a base shift schedule. Method 700 proceeds to 716 after the based transmission shift schedule is activated.

At 716, method 700 activates vehicle energy management parameters for cruise control mode drivability and fuel economy. In one example, the cruise control mode drivability and fuel economy parameters include a battery charge curve and a battery discharge curve as shown in FIG. 5. The vehicle system controller may adjust engine operating conditions so that the engine operates along the battery charging curve or the battery discharging curve to increase powertrain efficiency. The battery charging and discharging curves are compressed to the center of the engine fuel consumption island formed by curve 518. Thus, the battery charging curve operates the engine at higher engine torques as compared to if the engine were operating at the same speed according to the battery charging curve of the base engine BFSC map shown in FIG. 3. Further, the battery discharging curve operates the engine at lower engine torques as compared to if the engine were operating at the same speed according to the battery charging curve of the base BFSC map. Consequently, the battery may be charge biased to a higher SOC to allow longer duration battery discharging to allow the motor to assist the engine for extended durations while operating in cruise control mode as compared to operating the engine in base fuel consumption and efficiency mode without being in cruise control. Further, the engine and motor are operated based on the SOC weighting function described at 712 and the energy management parameters.

In one example, the driver demand torque or powertrain power level determined at 701 is allocated between the engine and the motor based on the engine's cruise control mode BFSC map (e.g., FIG. 5). In particular, the engine is operated at its present speed at a torque level corresponding to a nearest battery charging curve or battery discharging curve. For example, as described in FIG. 5, if the engine is operating at conditions 550 of FIG. 5, the engine is moved along its present speed to a torque where engine torque intersects battery discharge curve 508, which provides lower engine torques than battery discharge curve 308 of FIG. 3. Driver demand torque is met by adjusting motor torque such that $T_{DD}=T_{ENG}+T_{MOT}$. In this way, driver demand torque is distributed between the motor and the engine. Further, the engine, motor, and transmission are operated based on the transmission shift schedule described at 706, the SOC weighting function described at 704, and the energy management parameters.

At 718, method 700 judges if there is a tip-in. A tip-in may be characterized as a driver applying an accelerator pedal and increasing a power or torque request. If method 700 judges that a tip-in is in progress, the answer is yes and method 700 proceeds to 720. Otherwise, the transmission is shifted according to the cruise mode transmission shift schedule and method 700 proceeds to 722.

At 720, method 700 enables top gear shifting based on the shift schedule described at 706. The transmission downshifts at lower driver demand torques than when operating the vehicle with the cruise mode transmission shift schedule so that the powertrain may respond more quickly to the driver initiated maneuver. Method 700 proceeds to exit after operating the transmission according to the cruise control mode transmission shift schedule.

At 722, method 700 enables top gear shifting based on the shift schedule activated at 714. The transmission downshifts at higher driver demand torques than when operating the vehicle with the base transmission shift schedule so that the motor may assist the engine and operate the engine at a lower speed where it may operate more efficiently. Method 700 proceeds to exit after operating the transmission according to the base transmission shift schedule.

Thus, the method of FIG. 7 provides for a powertrain operating method, comprising: distributing a driver demand torque request between an engine and a motor responsive to a first battery charging curve and a first battery discharge curve while not operating a vehicle in cruise control mode; and distributing the driver demand torque request between the engine and the motor responsive to a second battery charging curve and a second battery discharging curve while operating the vehicle in cruise control mode. The method includes where the first battery charge curve is based on engine torque, engine speed, and engine brake specific fuel consumption. The method includes where the first battery discharge curve is based on engine torque, engine speed, and engine brake specific fuel consumption, where the first charge curve is based on a first group of engine torque values, where the first discharge curve is based on a second group of engine torque values, and where engine torque values of the second group of engine torque values are greater than the engine torque values of the first group of engine torque values.

In some examples, the method includes where the second battery charge curve is based on engine torque, engine speed, and engine brake specific fuel consumption. The method includes where the second battery charge curve is based on a third group of engine torque values, and where engine torque values of the third group of engine torque values are greater than the engine torque values of the first group of engine torque values. The method includes where the second battery discharge curve is based on engine torque, engine speed, and engine brake specific fuel consumption, where the second discharge curve is based on a fourth group of engine torque values, and where engine torque values of the third group of engine torque values are less than the engine torque values of the second group of engine torque values.

The method of FIG. 7 also provides for a powertrain operating method, comprising: activating a first battery charging and discharging strategy when not operating a vehicle in cruise control mode; and activating a second battery charging and discharging strategy when operating the vehicle in cruise control mode. The method further comprises distributing a driver demand torque request between an engine and a motor responsive to a first charge curve and a first discharge curve while not operating a vehicle in cruise control mode, and distributing the driver demand torque request between the engine and the motor responsive to a second charge curve and a second discharge curve while operating the vehicle in cruise control mode.

In some examples, the method includes where the first battery charging and discharging strategy does not charge or discharge a vehicle battery when the vehicle battery charge is within a first battery state of charge range. The method includes where the second battery charging and discharging strategy does not charge or discharge a vehicle battery when the vehicle battery charge is within a second battery state of charge range, the second battery state of charge range different from the first battery state of charge range. The method includes where first battery charging and discharging strategy includes a desired nominal battery state of charge that is less than desired nominal battery state of charge of the second battery charging and discharging strategy. The method of includes where vehicle speed in controlled to a desired vehicle speed in the vehicle cruise control mode via adjusting engine and motor torque. The method further comprises shifting a transmission responsive to a first shift schedule when not operating the vehicle in cruise control mode and shifting the transmission responsive to a second shift schedule when operating the vehicle in cruise control mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
   distributing a driver demand torque request between an engine and a motor responsive to a first battery charging curve and a first battery discharging curve while not operating a vehicle in cruise control mode via a controller; and
   distributing the driver demand torque request between the engine and the motor responsive to a second battery charging curve and a second battery discharging curve while operating the vehicle in cruise control mode via the controller.

2. The method of claim 1, wherein the first battery charging curve is based on engine torque, engine speed, and engine brake specific fuel consumption.

3. The method of claim 2, where the first battery discharging curve is based on engine torque, engine speed, and engine brake specific fuel consumption, where the first battery charging curve is based on a first group of engine torque values, where the first battery discharging curve is based on a second group of engine torque values, and where engine torque values of the second group of engine torque values are greater than the engine torque values of the first group of engine torque values.

4. The method of claim 3, where the second battery charging curve is based on engine torque, engine speed, and engine brake specific fuel consumption.

5. The method of claim 4, where the second battery charging curve is based on a third group of engine torque values, and where engine torque values of the third group of engine torque values are greater than the engine torque values of the first group of engine torque values.

6. The method of claim 5, where the second battery discharging curve is based on engine torque, engine speed, and engine brake specific fuel consumption, where the second battery discharging curve is based on a fourth group of engine torque values, and where the engine torque values of the third group of engine torque values are less than the engine torque values of the second group of engine torque values.

7. A powertrain operating method, comprising:
activating a first battery charging and discharging strategy and operating an engine and an electric machine responsive to the first battery charging and discharging strategy via a controller when not operating a vehicle in cruise control mode; and
activating a second battery charging and discharging strategy and operating the engine and the electric machine responsive to the second battery charging and discharging strategy via the controller when operating the vehicle in cruise control mode.

8. The method of claim 7, further comprising distributing a driver demand torque request between the engine and the electric machine responsive to a first battery charging curve and a first battery discharging curve while not operating the vehicle in cruise control mode, and distributing the driver demand torque request between the engine and the electric machine responsive to a second battery charging curve and a second battery discharging curve while operating the vehicle in cruise control mode.

9. The method of claim 7, where the first battery charging and discharging strategy does not charge or discharge a vehicle battery when a vehicle battery charge is within a first battery state of charge range.

10. The method of claim 9, where the second battery charging and discharging strategy does not charge or discharge the vehicle battery when the vehicle battery charge is within a second battery state of charge range, the second battery state of charge range different from the first battery state of charge range.

11. The method of claim 10, where the first battery charging and discharging strategy includes a desired nominal battery state of charge that is less than a desired nominal battery state of charge of the second battery charging and discharging strategy.

12. The method of claim 11, where vehicle speed is controlled to a desired vehicle speed in the vehicle cruise control mode via adjusting engine and motor torque.

13. The method of claim 7, further comprising shifting a transmission responsive to a first shift schedule when not operating the vehicle in cruise control mode and shifting the transmission responsive to a second shift schedule when operating the vehicle in cruise control mode.

14. A system, comprising:
an engine;
a motor/generator;
a disconnect clutch positioned in a powertrain between the engine and the motor/generator;
a transmission coupled to the motor/generator; and
a controller including executable instructions stored in non-transitory memory to downshift the transmission from a gear at a first driver demand torque while a vehicle is operated in a cruise control mode and downshift the transmission from the gear at a second driver demand torque while the vehicle is not operated in the cruise control mode, and instructions to activate a first battery charging and discharging strategy when not operating the vehicle in the cruise control mode, and further comprising additional instructions to activate a second battery charging and discharging strategy when operating the vehicle in the cruise control mode.

15. The system of claim 14, where the gear is a highest gear in the transmission.

16. The system of claim 14, where the first battery charging and discharging strategy does not charge or discharge a vehicle battery when a vehicle battery charge is within a first battery state of charge range.

17. The system of claim 15, further comprising additional instructions to distribute a driver demand torque request between the engine and the motor/generator responsive to a first battery charging curve and a first battery discharging curve while not operating the vehicle in the cruise control mode.

18. The system of claim 17, further comprising additional instructions to distribute the driver demand torque request between the engine and the motor/generator responsive to a second battery charging curve and a second battery discharging curve while operating the vehicle in the cruise control mode.

19. The system of claim 18, where vehicle speed is controlled to a desired speed in the vehicle cruise control mode via adjusting engine torque and motor torque.

* * * * *